June 17, 1930.  A. B. WILLI  1,764,706
PUMP
Filed Oct. 17, 1927

INVENTOR.
Albert B. Willi
BY W. W. Harris
ATTORNEY.

Patented June 17, 1930

1,764,706

UNITED STATES PATENT OFFICE

ALBERT B. WILLI, OF DETROIT, MICHIGAN, ASSIGNOR TO CONTINENTAL MOTORS CORPORATION, OF DETROIT, MICHIGAN, A CORPORATION OF VIRGINIA

PUMP

Application filed October 17, 1927. Serial No. 226,610.

This invention relates to pumps and refers more particularly to water pumps ordinarily employed for circulating cooling water throughout the cooling systems of internal combustion engines.

In water pumps of the above character it is customary to provide one or more packing devices for the pump shaft in order to prevent leakage of water from the pump housing. Such packing proves unsatisfactory since the packing becomes worn and must be taken up or tightened by the usual nut, from time to time, in order to prevent leakage. It is also necessary in many instances to renew the packing within comparatively short intervals. Furthermore when the engine becomes heated to a fairly high temperature the pump shaft, packing, and associated parts expand. On cooling, the metal parts contract to a greater degree than the packing material giving rise to leakage of water past the packing.

One object of my invention is to provide a pump constructed to eliminate the aforesaid difficulties. A further object is to eliminate the customary packing with its difficulties and to provide a pump shaft seal which will not leak, and which will provide an effective seal regardless of temperature conditions of the engine and pump parts.

Further objects of my invention reside in the combination and arrangement of parts more particularly hereinafter described and claimed.

Figure 1:
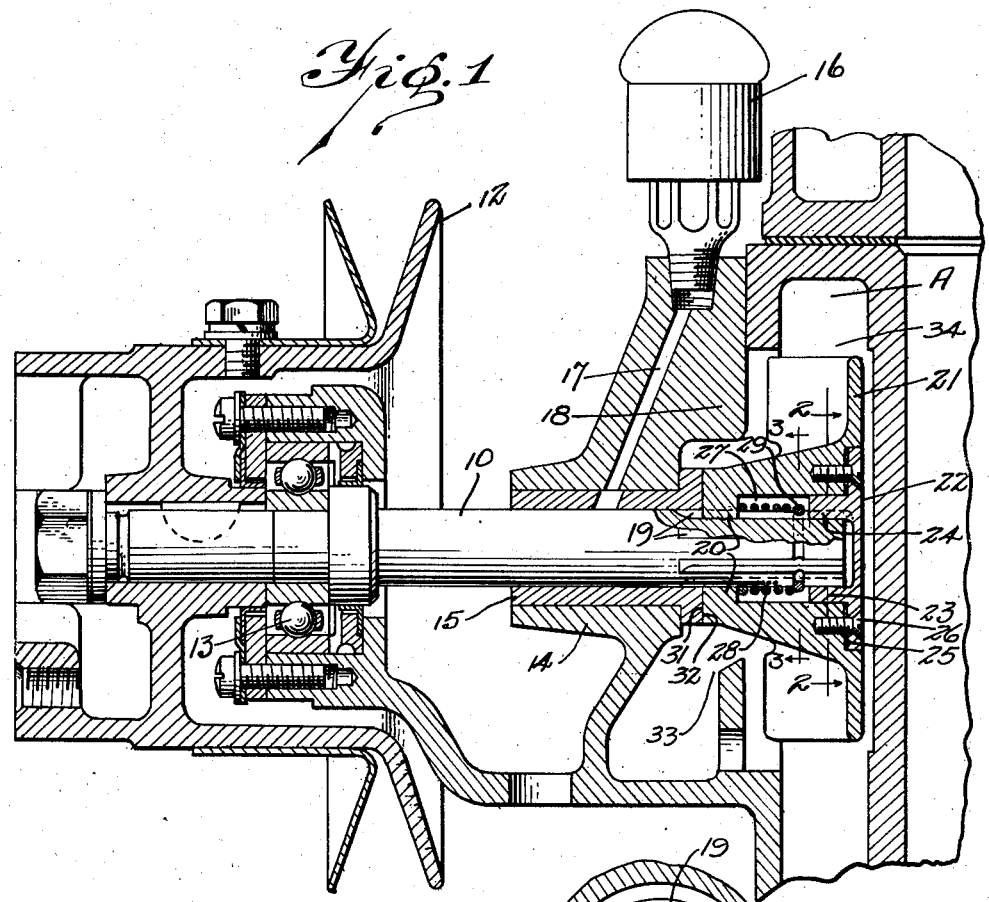
Figure 2:
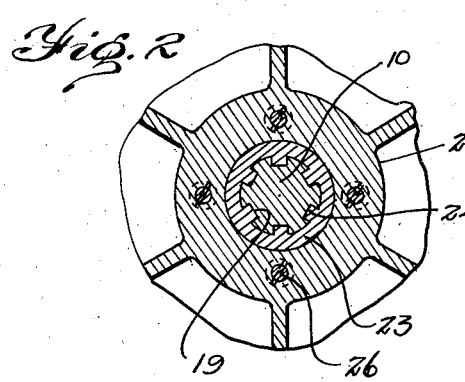
Figure 3:
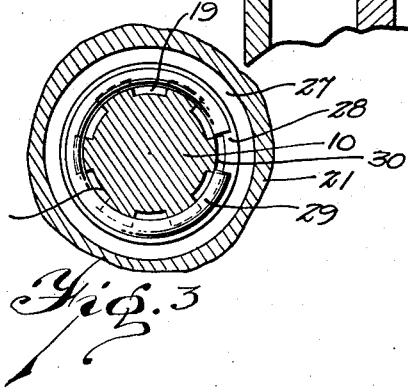

Referring to the accompanying drawings in which like reference characters indicate corresponding parts, Fig. 1 is a sectional elevation view showing my invention, Fig. 2 is a detail section view through 2—2 of Fig. 1, and Fig. 3 is a detail enlarged section view through 3—3 of Fig. 1.

In the drawings reference character A represents the usual water jacket of an internal combustion engine, it being customary in one type of pump installation to mount the water pump within such a water jacket. Illustrating my invention in such a combination, I may conveniently drive my pump from a drive shaft 10 which may carry the usual fan (not shown) at the front end of the shaft. 12 is a pulley driven by the usual belt operating from a driving pulley usually carried at the front end of the engine crankshaft (not shown), the pulley 12 serving to drive the shaft 10.

The shaft 10 is rotatably mounted in spaced bearings 13, 14, the former taking the thrust from the fan and pump as will presently be apparent. The bearing 14 carries a bushing 15 engageable with the shaft 10 and if desired the usual oiler 16 may be provided for supplying lubricant to the bushing 15 and shaft 10 through lubricant passage 17 as will be readily understood. The oiler 16 and bearing 14 may be formed with a water jacket cover 18 completing the pump housing.

The shaft 10 is formed with one or more splines or grooves 19 receiving the projections 20 of the pump impeller 21. 22 is an annular member formed with a hub 23 also provided with projections 24 engageable in splines 19. The annular member 22 and impeller 21 are formed with cooperating faces receiving herebetween a sealing gasket 25, screws 26 serving to hold the member 22 in fixed relation with the impeller tightly pressing the sealing gasket 25. The impeller is formed with an annular pocket 27 for receiving a spring 28 one end of which is anchored to the shaft 10 and the other end acting on the impeller 21. One convenient means for anchoring the spring may comprise a split abutment ring 29 which in assembling may be snapped into position in the annular groove 30 formed in shaft 10. Thus the spring 28 bears against the ring 29 which serves to anchor the spring. The spring at its other end acts against the impeller 21 forcing the faces 31, 32 of the bushing 15 and impeller 21 respectively relatively against each other. The bushing 15 is preferably pressed in the bearing 14 and is thus held in a nonrotating position, and the faces 31, 32 are accurately machined so as to provide a water tight running fit. A small amount of clearance is provided between ring 29 and hub 23 so that as the faces 31, 32 become worn the spring 28 will automatically take up such wear, moving the impeller 21, and annular member 22 as a unit axially of the shaft 10 toward the bushing 15.

By reason of my pump construction the impeller 21 is driven from shaft 10 through splines 19 and projections 20, 24, the splines permitting the aforesaid movement of the impeller and member 22 axially of the drive shaft.

The spring 28 is sufficiently strong, to at all times, tightly force the impeller face 32 against the bushing face 31 overcoming any thrust from the impeller, should the impeller blades be arranged to cause a thrust against the spring. Such a thrust would be entirely taken up through the spring 28, ring 29, shaft 10, and thrust bearing 13. Should the thrust react in the opposite direction then the contact of the faces 31, 32 will be increased to advantage in maintaining a water seal therebetween. The usual or other conveniently formed pump inlet and outlet 33, 34 are provided.

In operation a water film will be maintained between the faces 31, 32 serving to prevent passage of water between these faces and further serving to reduce the wear of these faces. The spring 28 will at all times maintain adequate pressure between faces 31, 32 regardless of temperature conditions and as any wear takes place the spring will automatically take up such wear by moving the impeller 21 and annular member 22 as a unit toward bushing 15. The spring pocket 27 is kept free of water by reason of the gasket 25 and the fluid seal at the faces 31, 32. Thus I am enabled to dispense with the usual shaft stuffing or packing ordinarily carried at the left (as shown in Fig. 1.) of the bushing 15. It will be observed that leakage between bearing 14 and bushing 15 can not occur owing to the pressed fit of these parts.

My construction greatly simplifies the pump construction since the parts may be readily assembled in position and may be cheaply manufactured.

Other embodiments of my invention will present themselves in connection with the general pump arrangement as shown, and in connection with other pump arrangements and I do not limit my invention except as specifically recited in the appended claims.

What I claim as my invention is:

1. A pump comprising a drive shaft, an impeller, means for driving the impeller from the drive shaft, an element having a water seal face fixed against movement axially of the drive shaft, said impeller provided with a water seal face, and yielding means forcing the said water seal faces relatively together for maintaining a water seal, said impeller being slidably mounted on the drive shaft.

2. A pump comprising a drive shaft, an impeller, means for driving the impeller from the drive shaft, an element having a water seal face fixed against movement axially of the drive shaft, said impeller provided with a water seal face, yielding means forcing the said water seal faces relatively together for maintaining a water seal, said impeller being slidable axially of the drive shaft, and means anchoring said yielding means to the driving shaft whereby the thrust reaction is transmitted to the drive shaft.

3. A pump comprising a drive shaft, an impeller having a recessed hub, means for driving the impeller from the drive shaft within the recess of the impeller hub, an element having a water seal face fixed against movement axially of the drive shaft, said impeller provided with a water seal face, and a spring surrounding the drive shaft and arranged to act against the impeller to force the said water seal face of the impeller toward the water seal face of the said element.

4. A pump comprising a drive shaft, an impeller, an element surrounding the shaft and fixed axially thereof, and a spring housed by the impeller and acting on the impeller to force the impeller against the said element to maintain a water film seal between the impeller and element.

5. A pump comprising a drive shaft, an impeller driven from the drive shaft and slidable axially thereof, an annular member fixed to the impeller sealing one end of the drive shaft, said member having a sliding driven connection with the drive shaft, a sealing gasket between the impeller and the annular member, said impeller provided with an annular spring pocket, a spring anchored to the drive shaft within the spring pocket and acting against the impeller to urge the impeller axially of the drive shaft, a bushing surrounding the drive shaft and fixed relative thereto, said bushing and impeller having cooperating bearing faces maintained in contact by said spring for providing a water seal.

6. A pump comprising a drive shaft, an impeller slidably mounted on the shaft and driven therefrom, a bearing element contacting with the drive shaft for journalling the shaft, said element being fixed with respect to the shaft, and a spring acting on the impeller to force the impeller against said bearing element to maintain a water film seal between the impeller and element.

7. A pump comprising a drive shaft, an element fixed with respect to the shaft and journalling the shaft, an impeller slidably mounted on one end of the shaft, said impeller provided with a spring pocket, a member carried by the impeller forming a closure for the spring pocket and enclosing the shaft end, and a spring within said pocket urging the impeller in fluid sealing contact with said element.

8. A pump comprising a rotatable drive shaft fixed against axial movement, an impeller adapted to be driven by said shaft, a relatively fixed element providing a fluid seal in cooperation with the impeller, and yielding means acting on the impeller to urge the impeller axially of the drive shaft toward said fixed element.

9. A pump comprising a rotatable drive shaft fixed against axial movement, an impeller adapted to be driven by said shaft, a relatively fixed element providing a fluid seal in cooperation with the impeller, and a spring anchored at one end thereof to the drive shaft and having its other end thereof acting on the impeller to urge the impeller axially of the drive shaft toward said fixed element.

10. A pump comprising a drive shaft, an element fixed with respect to the shaft and journalling the shaft, an impeller slidably mounted on one end of the shaft, said impeller provided with a spring pocket, a member carried by the impeller forming a closure for the spring pocket and enclosing the shaft end, and a spring within said pocket urging the impeller in fluid sealing contact with said element, said closure member being provided with a hub portion engaging the shaft end.

In witness whereof, I hereunto subscribe my name this 12th day of October, A. D. 1927.

ALBERT B. WILLI.